United States Patent [19]

Okamoto

[11] Patent Number: 5,714,276
[45] Date of Patent: Feb. 3, 1998

[54] METHOD FOR SUPPLYING FUEL GAS TO FUEL CELL ASSEMBLY

[75] Inventor: Takafumi Okamoto, Wako, Japan

[73] Assignee: Honda Giken Kogyo Kabushiki Kaisha, Tokyo, Japan

[21] Appl. No.: 728,962

[22] Filed: Oct. 11, 1996

[30] Foreign Application Priority Data

Oct. 11, 1995 [JP] Japan .................. 7-263340

[51] Int. Cl.$^6$ ............................................... H01M 8/04
[52] U.S. Cl. ............................................. 429/17; 429/19
[58] Field of Search ............................. 429/17, 19, 20, 429/21, 13; 518/704, 703

[56] References Cited

U.S. PATENT DOCUMENTS

| | | | |
|---|---|---|---|
| 4,746,329 | 5/1988 | Christner et al. | 429/19 X |
| 4,772,634 | 9/1988 | Faroogue | 429/17 X |
| 4,812,373 | 3/1989 | Grimble et al. | 429/19 |

*Primary Examiner*—Anthony Skapars
*Attorney, Agent, or Firm*—Lyon & Lyon LLP

[57] ABSTRACT

An apparatus for supplying a fuel gas comprises a reformer for steam reforming of methanol supplied from a methanol tank, and a methanol-removing means for removing unreacted methanol contained in the fuel gas delivered from the reformer. The fuel gas, from which the unreacted methanol is effectively removed, can be supplied to a fuel cell assembly. Accordingly, no unreacted methanol remains in the fuel gas to be supplied to an anode of the fuel cell. Thus the power generation performance can be effectively maintained.

10 Claims, 3 Drawing Sheets

METHOD FOR SUPPLYING FUEL GAS TO FUEL CELL ASSEMBLY

BACKGROUND OF THE INVENTION

1. Field of the Invention:

The present invention relates to a method for supplying a fuel gas to a fuel cell assembly comprising a plurality of stacked fuel cells, each of the fuel cells including an anode and a cathode opposed to each other with a solid polymer electrolyte membrane interposed therebetween.

2. Description of the Related Art:

A fuel cell assembly comprising a plurality of stacked fuel cells alternating with separators, in which each of the fuel cells includes an anode and a cathode opposed to each other with a solid polymer electrolyte membrane interposed therebetween, has been developed and practically used for various applications.

Such a fuel cell assembly is constructed as follows. Namely, for example, a hydrogen gas (fuel gas) produced by steam reforming of methanol is supplied to an anode, and an oxidant Gas (air) is supplied to a cathode. Thus the hydrogen Gas is ionized and it flows through a solid polymer electrolyte membrane. Accordingly, an electric energy is obtained and discharged from the fuel cell assembly.

When the hydrogen gas is produced by steam reforming of methanol as described above, all of the methanol is not steam reformed. Unreacted methanol is undesirably contained in the hydrogen gas, and it is supplied to the anode in this state. For this reason, a problem is pointed out in that the starting voltage is greatly lowered due to the influence of unreacted methanol especially in the case of a fuel cell assembly of the solid polymer electrolyte membrane type operating at a low temperature.

The problem described above arises not only when the fuel gas is produced by steam reforming of methanol. The problem also arises when a fuel gas is produced, for example, by means of oxidation of methanol with air, or a reaction of methanol with steam and air.

SUMMARY OF THE INVENTION

The present invention has been made in order to solve the problem as described above. An object of the present invention is to provide a method for supplying a fuel gas to a fuel cell assembly, in which no unreacted methanol remains in the fuel gas to be supplied to an anode, thus making it possible to effectively maintain the power generation performance.

In order to achieve the object described above, the present invention resides in that a fuel gas is produced from methanol by the aid of a fuel-producing means, unreacted methanol contained in the fuel gas is removed, and then the fuel gas is supplied to a fuel cell. Accordingly, no unreacted methanol remains in the fuel gas to be supplied to the fuel cell. Thus it is possible to certainly avoid a decrease in power generation performance of a fuel cell assembly.

In preferred embodiments, the unreacted methanol is selectively oxidized by the aid of a catalyst composed of a noble metal, or the unreacted methanol is oxidized together with carbon monoxide. Thus it is possible to remove the unreacted methanol easily and certainly.

In another preferred embodiment, the unreacted methanol is condensed, and the condensed unreacted methanol is returned to a methanol tank. Thus it is possible to efficiently use the methanol.

The above and other objects, features and advantages of the present invention will become more apparent from the following description when taken in conjunction with the accompanying drawings in which preferred embodiments of the present invention are shown by way of illustrative examples.

DESCRIPTION OF THE PREFERRED EMBODIMENTS

Figure 1:
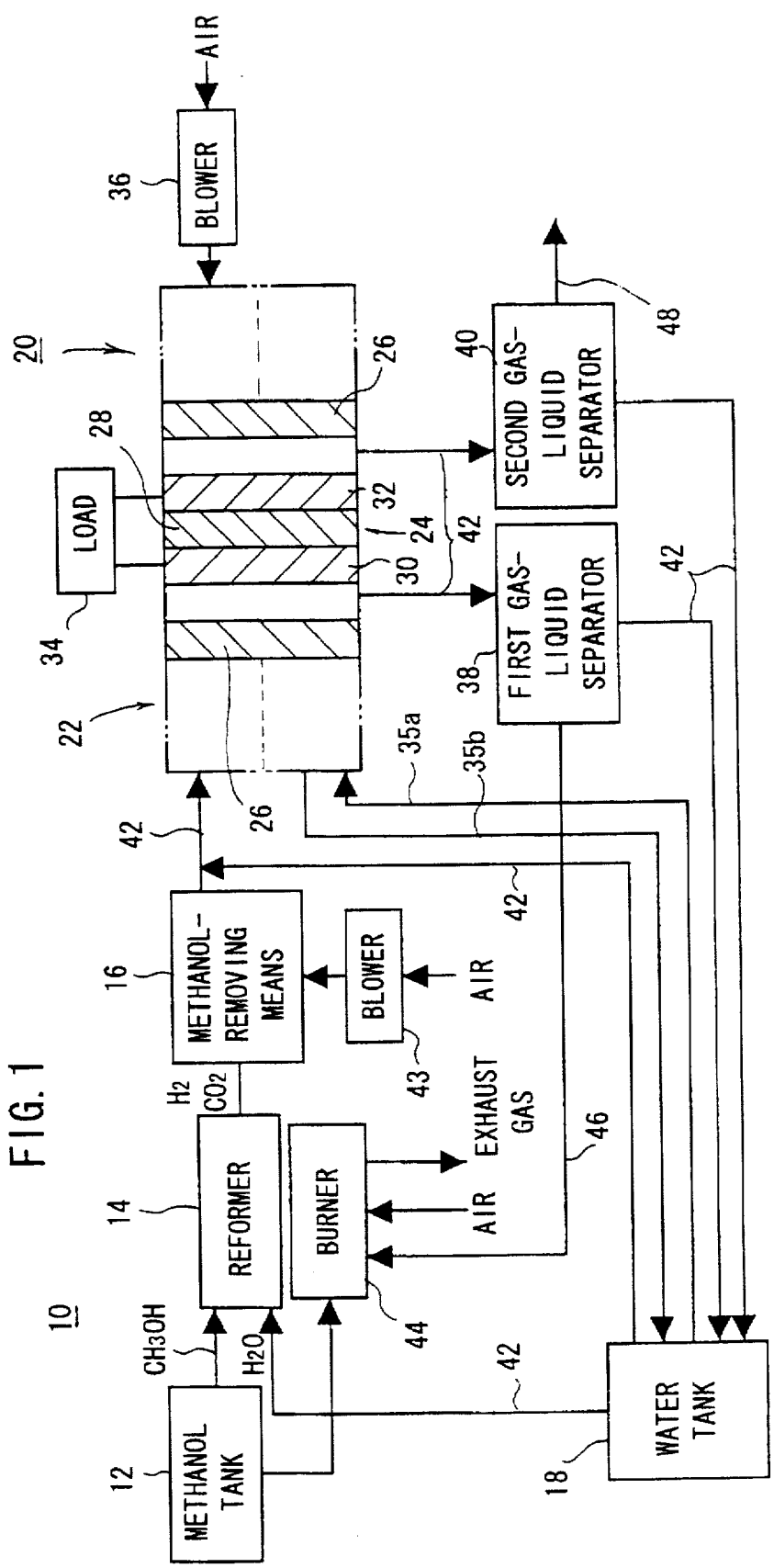
FIG. 1 explanatorily shows a schematic arrangement of an apparatus for supplying a fuel gas to a fuel cell assembly according to a first embodiment of the present invention.

FIG. 1 shows a schematic arrangement of an apparatus 10 for supplying a fuel gas to a fuel cell assembly according to a first embodiment of the present invention. This fuel gas-supplying apparatus 10 comprises a reformer (fuel-producing means) 14 for steam reforming of methanol ($CH_3OH$) supplied from a methanol tank 12, and a methanol-removing means 16 for removing unreacted methanol contained in a fuel gas (hydrogen gas and carbon dioxide gas) delivered from the reformer 14.

A water tank 18 is connected to the reformer 14. The water tank 18 is provided for supplying water to the reformer 14 and supplying water to humidify the fuel gas delivered from the methanol-removing means 16. A fuel cell assembly 20, to which the humidified fuel gas is supplied, comprises a plurality of stacked fuel cells 22. Each of the fuel cells 22 comprises a unit cell structural body 24 and separators 26 for interposing the unit cell structural body 24 therebetween.

The unit cell structural body 24 comprises a solid polymer electrolyte membrane 28. The unit cell structural body 24 further comprises a hydrogen electrode (anode) 30 and an air electrode (cathode) 32 which are opposed to each other with the solid polymer electrolyte membrane 28 interposed therebetween. The hydrogen electrode 30 and the air electrode 32 are connected to a load 34 such as an electric motor. Each separator 26 is formed to have an inlet hole (not shown) for introducing hydrogen gas and air into the unit cell structural body 24, and a cooling space (not shown) which communicates with the water tank 18 through passages 35a, 35b.

Other devices connected to the fuel cell assembly 20 include a blower 36 for introducing air (oxidant gas) in the atmosphere, and first and second gas-liquid separators 38, 40 for separating discharged components that are discharged from the fuel cell assembly 20 into gas and water, and supplying the separated water to the water tank 18. Each of the first and second gas-liquid separators 38, 40 comprises a cooling unit such as a radiator.

The water tank 18, the reformer 14, the methanol-removing means 16, the fuel cell assembly 20, and the first and second gas-liquid separators 38, 40 communicate with each other through passages 42. An air-introducing means 43 such as a blower for supplying air as an oxidant is connected to the methanol-removing means 16.

The reformer 14 is provided with a burner 44. Unreacted hydrogen, carbon dioxide, etc. are introduced into the burner 44 from the first gas-liquid separator 38 through a passage 46. Air is supplied to the burner 44, or unreacted oxygen, nitrogen, etc. in air are supplied to the burner 44 from the second gas-liquid separator 40 through a passage 48, if necessary.

The methanol-removing means 16 has a catalyst composed of a noble metal for selectively oxidizing unreacted methanol, such as Pt, Ru, Rh, or Pd, or an alloy thereof.

The operation of the fuel gas-supplying apparatus 10 constructed as described above will be explained in relation to the fuel cell assembly 20.

At first, methanol is supplied from the methanol tank 12 to the reformer 14. Water is supplied to the reformer 14 from the water tank 18. Thus methanol is steam reformed under the heating action effected by the burner 44. Upon start up, methanol is supplied to the burner 44.

The fuel gas, which is produced by the steam-reforming reaction of methanol, is supplied to the methanol-removing means 16 into which air is introduced from the air-introducing means 43. Accordingly, unreacted methanol contained in the fuel gas is selectively oxidized by the aid of the catalyst composed of the noble metal such as Pt, Ru, Rh, or Pd or the catalyst composed of the alloy which constitutes the methanol-removing means 16. Thus the unreacted methanol is effectively removed from the fuel The fuel gas, from which the unreacted methanol has been removed, is supplied to the hydrogen electrode 30 of the fuel cell assembly 20, in a humidified state in which water from the water tank 18 is added to the fuel gas.

On the other hand, air in the atmosphere (oxidant gas) is introduced into the air electrode 32 of the fuel cell assembly 20 from the blower 36. Cooling water is supplied to the separator 26 from the water tank 18 through the passages 35a, 35b.

Accordingly, the fuel gas is ionized (into hydrogen ion) in the fuel cell assembly 20, and it flows to the air electrode 32 through the inside of the solid polymer electrolyte membrane 28. The hydrogen ion reacts with oxygen and electrons at the air electrode 32 to produce water. Discharged components that are discharged from the hydrogen electrode 30 of the fuel cell assembly 20 are introduced into the first gas-liquid separator 38, and separated into gas and water. On the other hand, discharged components that are discharged from the air electrode 32 are introduced into the second gas-liquid separator 40, and separated into gas and water. Water recovered by the first and second gas-liquid separators 38, 40 is supplied to the water tank 18 through the passages 42 respectively.

Unreacted hydrogen gas, carbon dioxide gas, and unrecovered water, which are separated by the first gas-liquid separator 38, are conducted into the burner 44 through the passage 46, and used to maintain the temperature for combustion and reforming. Unreacted oxygen gas, nitrogen gas, and unrecovered water, which are separated by the second gas-liquid separator 40, are discharged through the passage 48, or conducted into the burner 44, if necessary.

In the first embodiment as described above, the fuel gas delivered from the reformer 14 is supplied to the methanol-removing means 16. Thus the unreacted methanol contained in the fuel gas is selectively oxidized. Therefore, the unreacted methanol can be effectively removed from the fuel gas to be supplied to the hydrogen electrode 30. Accordingly, an improvement is obtained in that it is possible to effectively avoid a decrease in power generation performance of the fuel cell 22, which would be otherwise caused by the unreacted methanol.

Figure 2:
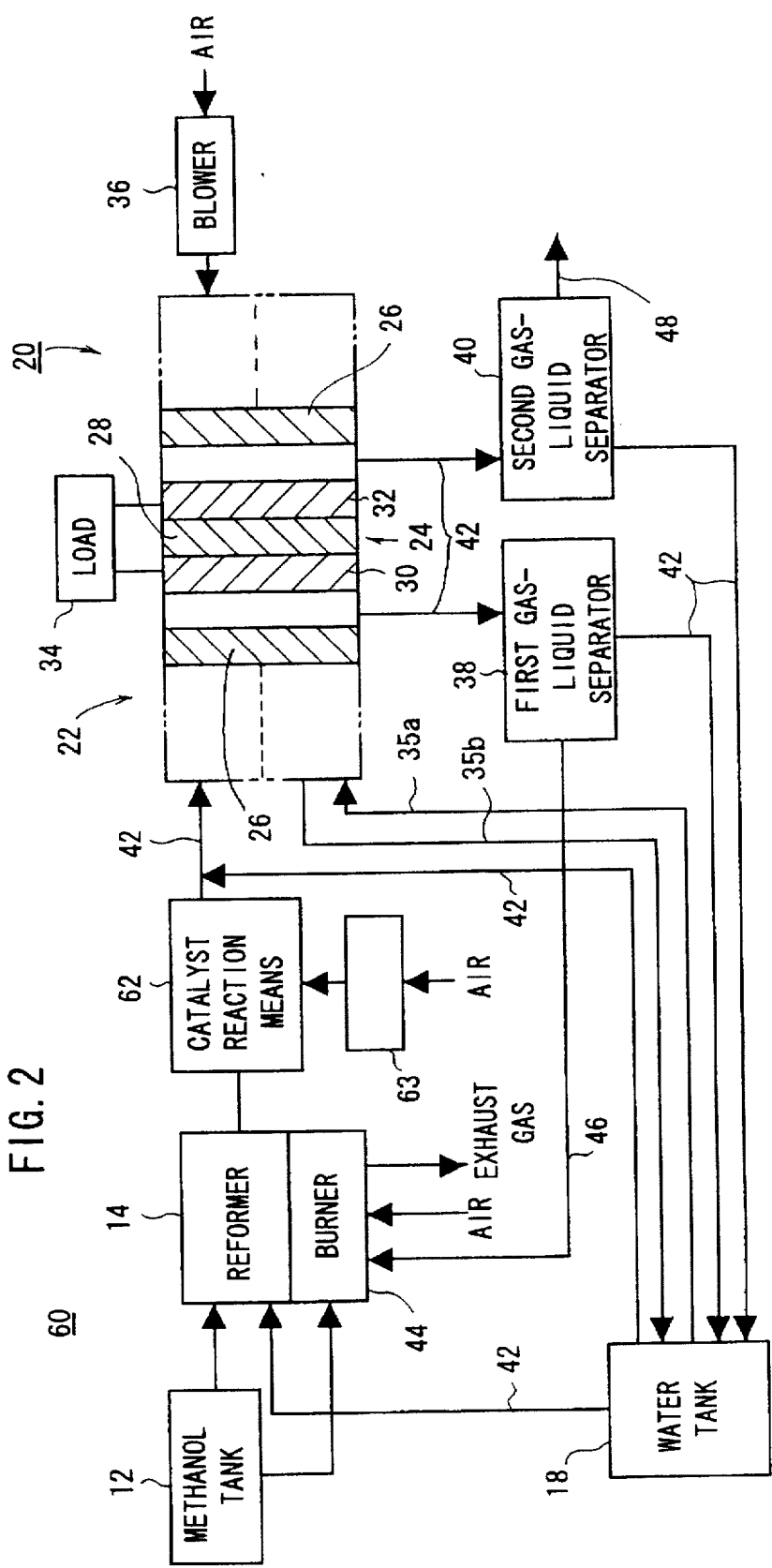
FIG. 2 explanatorily shows a schematic arrangement of an apparatus for supplying a fuel gas to a fuel cell assembly according to a second embodiment of the present invention.

Next, FIG. 2 shows a schematic arrangement of an apparatus 60 for supplying a fuel gas to a fuel cell assembly according to a second embodiment. The same constitutional components as those of the fuel gas-supplying apparatus 10 according to the first embodiment are designated by the same reference numerals, whereby explanation of which will be omitted.

This fuel gas-supplying apparatus 60 comprises a reformer 14 for steam reforming of methanol supplied from a methanol tank 12, and a catalyst reaction means 62 as a carbon monoxide selective oxidation means for selectively oxidizing carbon monoxide. An air-introducing means 63 such as a blower for supplying air to serve as an oxidant is connected to the catalyst reaction means 62.

The catalyst reaction means 62 has, as a catalyst for selectively oxidizing CO, a catalyst composed of a noble metal comprising Pt, Ru, Rh, or Pd, or an alloy thereof. The catalyst reaction means 62 has a function to oxidize unreacted methanol together with carbon monoxide.

Therefore, in the second embodiment, when the fuel gas produced by the steam-reforming reaction of methanol is introduced into the catalyst reaction means 62, carbon monoxide and unreacted methanol contained in the fuel gas are oxidized by the aid of the catalyst composed of the noble metal comprising Pt, Ru, Rh, or Pd, or the alloy thereof which serves as the catalyst for selectively oxidizing CO. Accordingly, the unreacted methanol is effectively removed from the fuel gas. Thus an improvement equivalent to that obtained in the first embodiment is obtained.

Figure 3:
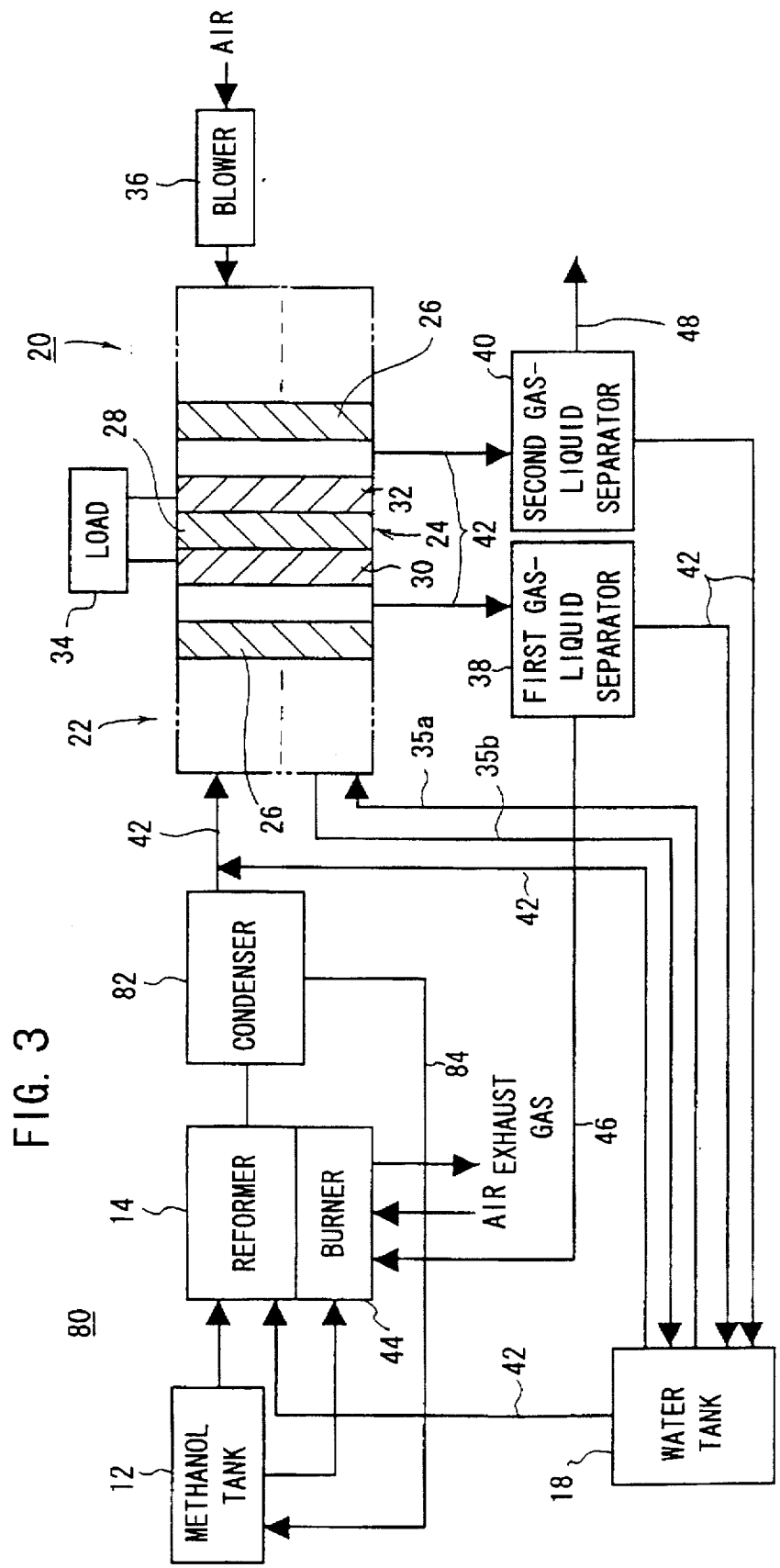
FIG. 3 explanatorily shows a schematic arrangement of an apparatus for supplying a fuel gas to a fuel cell assembly according to a third embodiment of the present invention.

Next, FIG. 3 shows a schematic arrangement of an apparatus 80 for supplying a fuel gas to a fuel cell assembly according to a third embodiment. This fuel gas-supplying apparatus 80 comprises a reformer 14 for steam reforming of methanol supplied from a methanol tank 12, a condenser 82 for liquefying unreacted methanol in the fuel gas delivered from the reformer 14, and a returning passage 84 for returning the unreacted methanol liquefied by the condenser 82 to the methanol tank 12.

In the third embodiment, when the fuel gas produced by the steam-reforming reaction of methanol is introduced into the condenser 82, the unreacted methanol contained in the fuel gas is liquefied. The liquefied methanol is returned to the methanol tank 12 through the returning passage 84. Accordingly, the unreacted methanol can be effectively removed from the fuel gas. Moreover, the methanol can be efficiently used again without discarding the unreacted methanol.

The methanol-removing means 16 and the catalyst reaction means 62, or the methanol-removing means 16 and the condenser 82, or the catalyst reaction means 62 and the condenser 82, or the methanol-removing means 16, the catalyst reaction means 62, and the condenser 82 can be arranged in series between the reformer 14 and the fuel cell assembly 20 respectively. Accordingly, an advantage is obtained in that the unreacted methanol in the fuel gas can be removed more certainly.

The first to third embodiments have adopted, as the fuel-producing means, the reformer 14 for producing the fuel gas by steam reforming of methanol. However, there is no limitation thereto. Any means for producing a fuel gas based on oxidation of methanol with air or a reaction of methanol with steam and air may be used.

As described above, in the method for supplying a fuel gas to a fuel cell assembly according to the present invention, unreacted methanol in the fuel gas produced from methanol is removed, and then the fuel gas is supplied to a fuel cell. Accordingly, no unreacted methanol remains in the fuel gas to be supplied to the fuel cell. Thus it is possible to effectively avoid a decrease in power generation performance of the fuel cell assembly.

What is claimed is:

1. A method for supplying a fuel gas to a fuel cell assembly comprising a plurality of stacked fuel cells, each of said fuel cells including an anode and a cathode opposed to each other with a solid polymer electrolyte membrane interposed therebetween, said method comprising the steps of:

producing said fuel gas for operating said fuel cell assembly from methanol by the aid of a fuel-producing means;

removing unreacted methanol contained in said produced fuel gas; and supplying, to said fuel cells, said fuel gas from which said unreacted methanol has been removed.

2. The method according to claim 1, wherein said unreacted methanol is removed by selectively oxidizing said unreacted methanol by the aid of a catalyst composed of a noble metal.

3. The method according to claim 1, wherein said unreacted methanol is removed by oxidizing said unreacted methanol together with carbon monoxide by the aid of a means for selectively oxidizing carbon monoxide.

4. The method according to claim 1, wherein said unreacted methanol is removed by condensing said unreacted methanol.

5. The method according to claim 4, wherein said condensed unreacted methanol is returned to a methanol tank.

6. A method for supplying a fuel gas to a fuel cell assembly from a fuel gas producing means that uses methanol as a supply gas source, the method comprising the step of:

removing unreacted methanol contained in said fuel gas produced by said fuel gas producing means.

7. The method according to claim 6, wherein said unreacted methanol is removed by selectively oxidizing said unreacted methanol by the aid of a catalyst composed of a noble metal.

8. The method according to claim 6, wherein said unreacted methanol is removed by oxidizing said unreacted methanol and carbon monoxide contained in the fuel gas produced by said fuel gas producing means by the aid of a means for selectively oxidizing carbon monoxide.

9. The method according to claim 6, wherein said unreacted methanol is removed by condensing said unreacted methanol.

10. The method according to claim 9, wherein said condensed unreacted methanol is returned to a methanol tank.

* * * * *